Oct. 27, 1931.  L. E. WHITTINGTON ET AL  1,829,251
ENGINE MOUNTING FOR AUTOMOTIVE VEHICLES
Filed Aug. 18, 1930  2 Sheets-Sheet 2
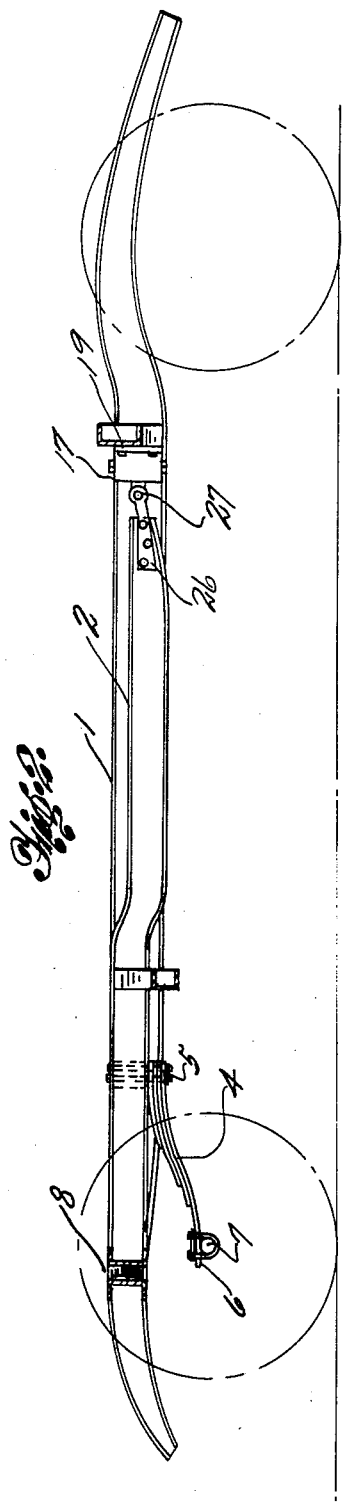
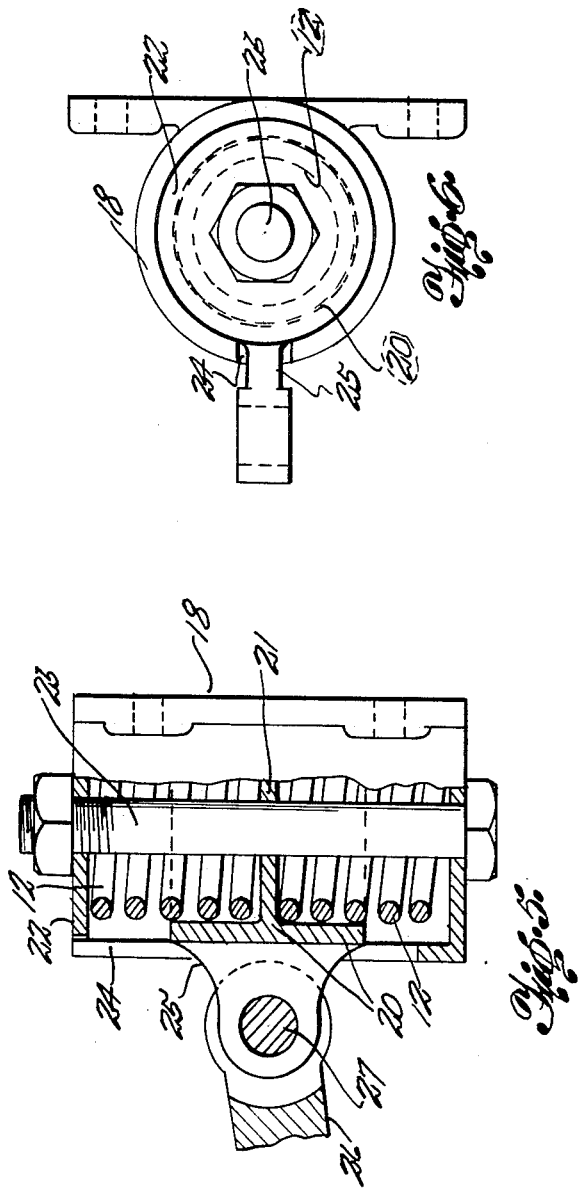
Inventors
Louis E. Whittington
Edwin A. Tuthill
Adam E. Fisher
By Attorney Patented Oct. 27, 1931

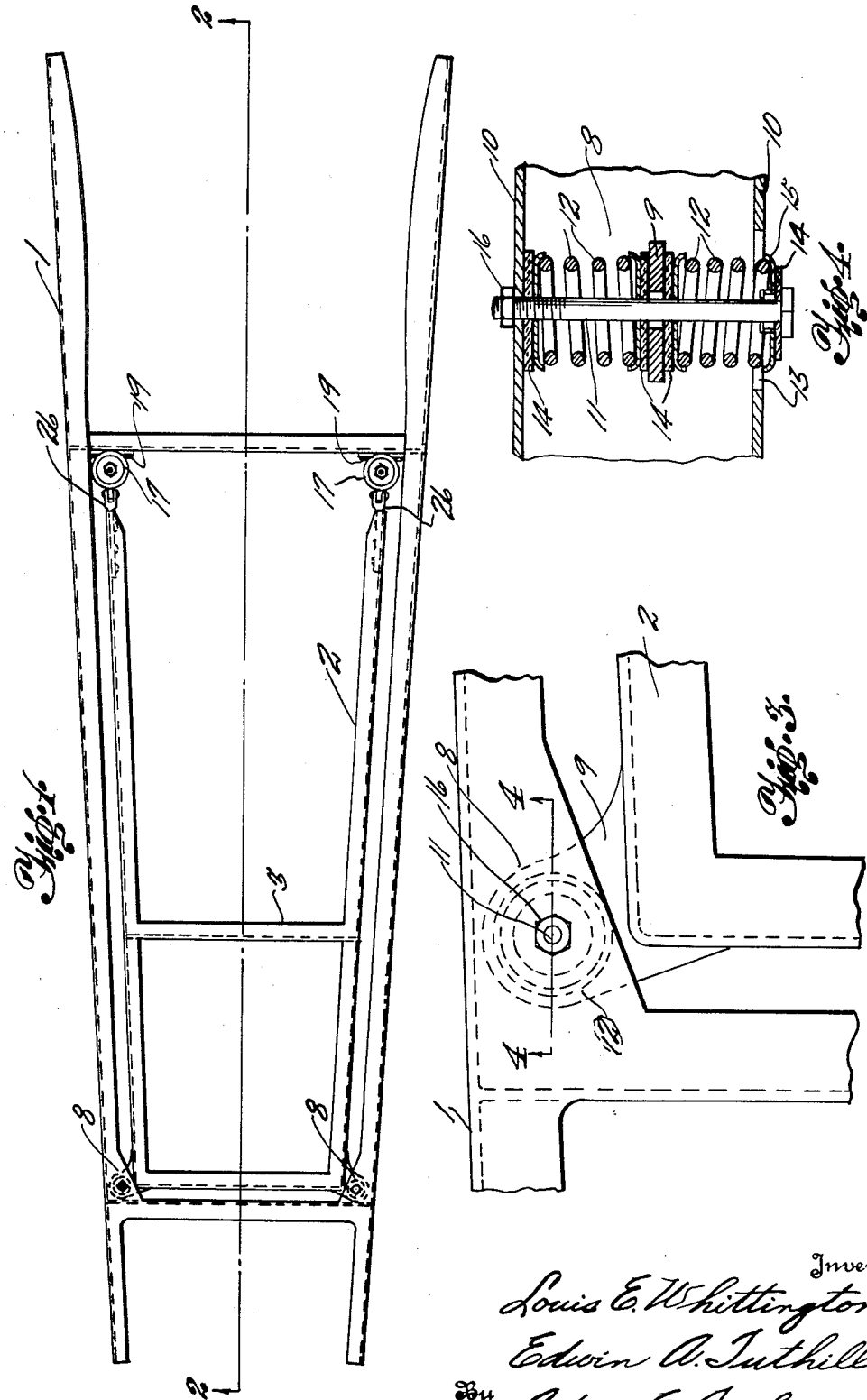

1,829,251

UNITED STATES PATENT OFFICE

LOUIS E. WHITTINGTON AND EDWIN A. TUTHILL, OF SILVIS, ILLINOIS

ENGINE MOUNTING FOR AUTOMOTIVE VEHICLES

Application filed August 18, 1930. Serial No. 475,918.

This invention comprises an engine mounting for automotive or motor vehicles.

The primary object is to provide a secondary engine supporting frame separate from the primary or main frame or chassis of the vehicle, but resiliently connected therewith in such a manner that the vibrations of the engine will be absorbed by the said resilient connections and will not be transmitted to the main or primary frame.

Another object is to provide a secondary or engine frame resiliently supported at each end within a primary or vehicle frame, the forward end of the engine frame being also resiliently supported above the front axle which carries the said vehicle frame, thus efficiently distributing the vibrations of the engine frame to either end of the vehicle, where the said vibrations are effectually absorbed by the said resilient supports.

Another object is to provide a special form of resilient connection for supporting the said engine frame, within the vehicle frame, the same comprising a support braced at either side by springs set to hold the support to a common center, and a pivotal connection extended from the support to the vehicle frame.

With these and such other objects in view as may appear in the course of the following specifications, attention is called to the accompanying drawings as constituting part of the specifications and wherein:

Figure 1 is a plan view of the invention as mounted within a vehicle frame;

Figure 2 is a side elevation taken on the line 2—2 in Figure 1;

Figure 3 is an enlarged detail view in plan, showing one of the connections at the forward end of the engine frame;

Figure 4 is an enlarged detail in vertical section, taken on the line 4—4 in Figure 3;

Figure 5 is an enlarged detail in vertical section of one of the connections at the rear end of the engine frame, a medial portion thereof being broken away;

Figure 6 is a plan view of the connection shown in Figure 5.

In combination with a conventional form of primary or vehicle frame 1, the invention comprises a secondary or engine frame 2 loosely mounted within the engine frame and resiliently connected therewith at each end, the said engine frame being of a length to extend from the front axle substantially towards the rear axle or rear portion of the vehicle frame. The frame 2 may be, of course, reinforced with any required number of cross braces 3. The resilient connections for the forward end of the frames consist of leaf springs 4 shackled rearwardly at 5 to the frame 2 and forwardly at 6 to the front axle 7. Additional resilient connections 8 are provided at each corner of the frames at the forward end thereof. These connections include heavy lugs 9 extended from the forward corners of the frame 2 within the webs 10 of the channels of the frame 1. Hanger bolts 11 passed through the webs 10 and the lugs 9 serve to anchor the lugs in position. Heavy coil springs 12 are then set over the bolts 11, at either side of the lugs 9 and serve to hold the lugs resiliently centered against vertical stresses transmitted from the frame 2. The bolts 11 pass loosely through the lower webs 10 which are cut away for this purpose as shown at 13. Washers 14 may be positioned at the ends of the springs 12 and at the lower ends of the bolts 11 cupped washers 15 are provided for the support of the lower ends of the springs 12. Thus the assembly of bolts and springs is permitted a certain lateral sway by reason of the cut-outs 13, and the tension of the springs 12 may be adjusted through the nuts 16. Thus the forward end of the frame 2 is resiliently anchored within the frame 1. Similar anchorages 17 are provided for the rear corners of the frame 2. However, at this end cylindrical casings 18 are bolted at 19 to the frame 1 and plungers 20 are slidably mounted therein, the said plungers having central webs 21 corresponding to the lugs 9 of the frontal connections. Similarly, springs 12 are mounted at either side of the webs 21 and serve to resiliently center the plungers 20 within the casings 18. The covers 22 of these casings are removable, and bolts 23 passed down through these covers, springs, webs and bottoms of the casings serve to hold the assemblies together and as means for adjusting the tension of the springs. Slots 24 are formed longitudinally in the casings 18, and pivot lugs 25 are rigidly anchored to the plungers 20 and have their free ends extended out through said slots. Bifurcated complementary lugs 26, rigidly connected with the rear corners of the frame 2, engage the lugs 25 and are pivotally connected therewith by means of bolts 27 passed through said lugs, suitable eyes being formed therein for that purpose.

Thus the engine frame 2 is resiliently anchored within the vehicle frame 1, and the length of the frame 2 is preferably such that vibrations imparted to it are absorbed by the resilient connections described located substantially near either end of the frame 1, whereby the stresses incident to such vibrations are more evenly distributed throughout the frame 1. The resilient frontal connections described permit of a certain lateral sway in the frame 2 which in itself takes care of a considerable amount of engine vibration and relieves the frame 1 thereof, while the springs 12, the tension of which may be adjusted as described, take care of and absorb vertical stresses or vibrations, thus also relieving the frame 1.

While we have herein described a certain specific method of constructing and assembling the elements of our invention, it is understood that same may be varied in minor details, not departing from the spirit of our invention, as described in the appended claims.

We claim:

1. In a motor vehicle having a primary frame and front axle, a secondary engine frame loosely mounted within the primary frame and supported at its frontal end upon the axle of the vehicle through leaf springs, and resilient connections between the corners of the secondary frame and primary frame, the said resilient connections at the frontal corners of the secondary frame being loosely mounted on the primary frame whereby to permit lateral movement of the frontal end of the said secondary frame.

2. In a resilient connection for connecting a primary and secondary frame of the kind described, the said primary frame including a channel member having its webs turned laterally inward in conventional manner, the said primary frame having an aperture through its upper web adjacent a corner of the secondary frame and having a relatively larger cut out through its lower web beneath the first mentioned aperture, a lug horizontally extended from the corner of the secondary frame and disposed between the webs of the primary frame, the said lug having an aperture, a bolt passed through the apertures in the primary frame webs and the lug and disposed loosely in the said cut out in the lower web, a nut on the upper end of the bolt above the said upper web, a head on the lower end of the bolt, and coil springs seated over the bolt above and below the lug, the upper spring being braced between the lug and the upper web of the primary frame and the lower spring braced between the lug and the head on the lower end of the bolt.

3. In a resilient connection for connecting a primary frame and secondary frame of the kind described, a cylindrical casing secured to the primary frame adjacent a corner of the secondary frame, the said casing having a longitudinal slot through its wall, a bolt mounted centrally through the said casing, a plunger slidably mounted in the casing and including a central web slidably engaging the said bolt, coil springs seated over the said bolt and braced between the ends of the casing and the said central web of the plunger, a pivot lug secured to the plunger and slidably extended through the said slot in the casing, and a bifurcated complementary lug secured to a corner of the secondary frame and pivotally connected to the pivot lug.

In testimony whereof we affix our signatures.

LOUIS E. WHITTINGTON.
EDWIN A. TUTHILL.